July 6, 1965    W. Y. HUTCHINSON ETAL    3,193,034
WEIGHING SCALE
Filed Jan. 6, 1961    3 Sheets-Sheet 3

INVENTORS:—
WILLIAM Y. HUTCHINSON
RUSSELL E. VANDERHOFF
BY:— Marzall, Johnston,
Cook n Root.
ATTORNEYS

United States Patent Office 3,193,034
Patented July 6, 1965

3,193,034
WEIGHING SCALE
William Y. Hutchinson, Chicago, and Russell E. Vanderhoff, Oak Lawn, Ill., assignors to Continental Scale Corporation, Chicago, Ill., a corporation of Delaware
Filed Jan. 6, 1961, Ser. No. 81,063
20 Claims. (Cl. 177—234)

The present invention relates in general to weighing scales, and has more particular reference to a scale having a weight carrying platform supported relatively close to the floor or support base on which the scale is mounted when in use, whereby the scale is especially well suited for use as a personal weight scale.

An important object of the present invention is to provide an inexpensive structure of the character mentioned, having unusual compactness attained through the novel form and arrangement of the operating components of the scale; a further object, in this connection, being to apply the weighing force, corresponding with the weight to be measured, upon a weighing spring through an indicator driving member; a still further object being to form the indicator driving member as a longitudinally movable rod or bar carrying means, such as a rack bar, for turning an indicator driving pinion and to connect the longitudinally movable rod with a weighing spring.

Another important object is to provide a scale structure embodying weight supporting levers, an extensible weighing spring, and an intermediate weight reducing bell crank lever drivingly interconnected between the weight supporting levers and the weighing spring, whereby an exceedingly lightweight spring may be employed for the measurement of relatively heavy weights to be measured; a further object being to connect the weight reducing bell crank lever with the weighing spring through a draw rod forming means for driving a visual weight indicator in response to the deflection or extension of the weighing spring under the influence of the application of a weight to be measured upon the weight supporting levers; still another object being to provide for driving the weight indicator by means of a pinion actuated by a rack bar connected with the draw rod and movable therewith in response to deflection of the weighing spring; yet another object being to form the rack bar for longitudinal sliding movement in one direction on the draw rod away from seating means formed on the rod to prevent movement of the rack bar thereon in the opposite direction, including resilient means, such as a helical spring, encircling the draw rod for normally urging the rack bar thereon against said seat; a still further object being to form the indicator driving rack bar as a frame slidably and rockably supported on the draw rod and having a readily adjustable counterbalance weight secured on the frame on the side of the draw rod remote from the rack bar, in order to tiltably urge the frame on the draw rod in a direction to press the rack bar into driving engagement with the indicator driving pinion, said counterbalance weight preferably comprising a length of wire stock mounted in the rack bar frame so that the weight of the length of wire stock may be adjusted merely by snipping off the ends thereof to a desired extent.

Another important object is to provide an improved indicator mechanism comprising a movable indicator element drivingly connected with a rack bar driven pinion, wherein the pinion is turnably journaled in a snug bearing at the end thereof remote from the connected indicator element, the end of the pinion adjacent the indicator element being supported in a half bearing opening toward the pinion driving rack bar, whereby the pinion may be held in said half bearing by action of the rack bar, the rack bar having associated means normally urging the same into driving engagement with the pinion whereby the pinion is thus yieldingly held in said half bearing.

Another important object is to provide an improved indicator mechanism comprising a movable indicator element drivingly connected with a rack bar driven pinion, wherein the pinion is turnably journaled in a snug bearing at the end thereof remote from the connected indicator element, the end of the pinion adjacent the indicator element being supported in a half bearing formed in a relatively thin, preferably sheet metal pinion support, the pinion being cut away, between the opposite ends thereof, to form a stem portion for turnable reception in said half bearing, a rack engaging pinion portion on one side of said half bearing, and an auxiliary pinion portion disposed on the other side of the half bearing in position for driving engagement directly with the indicator element, said element being formed with a toothed opening for driving connection with the auxiliary pinion portion, a threaded, axially extending stem being formed on the pinion, on the side of its auxiliary portion remote from said half bearing, in order to receive a clamping nut for securing the movable indicator element in driving engagement with the auxiliary pinion portion.

Another important object of the invention is to provide improved means for adjusting a weighing spring to calibrate the same in the weighing mechanism in which assembled for use, and also for zeroizing the indicator with which the weighing mechanism, including the spring, is cooperatively associated; a further object, in this connection, being to provide a flexible mounting member, supported in the main frame of a weighing scale and upon which flexible mounting member the weighing spring may be anchored at one end, and manually operable means, such as a screw threaded stem, for adjusting the flexed condition of the mounting member in order thus to shift and thereby adjust the anchored end of the weighing spring in the main frame; a still further object being to utilize a helical weighing spring and to provide for calibrating the same by securing its anchored end upon the head of a mounting and calibrating stem, the head having adjustable screw threaded connection with the coils of the spring in response to relative turning movement of the stem with respect to the spring, to thereby alter the effective length of the weighing spring that is connected with the weighing mechanism, said stem being supported upon the main frame in which the weighing mechanism is assembled; a still further object being to mount the spring supporting and calibrating stem in a flexible mounting member secured on the main frame of the scale, and to provide a screw threaded stem connected with the flexible mounting member adjacent the spring supporting and calibrating stem for adjusting the flexed condition of the flexible mounting member, the threaded stem having a manually operable head extending in position overlying and concealing the spring remote end of the calibrating stem, said manually operable head being removable from the threaded stem to reveal and permit access to the calibrating stem, the same being preferably formed, as with a diametral slot, for engagement with a calibrating tool.

Another important object is to provide a scale having a frame or base and a weight receiving platform made of relatively thin sheet metal panels having peripheral flanges, whereby the platform and base form a shallow box-like enclosure for housing the component parts of the scale mechanism, including the provision of load carrying means for applying the load of the weighing spring and the thrust components of the bell crank lever upon the relatively strong peripheral flange portions at the opposite ends of the base; a further important object, in this connection, being to provide a load carrying beam structure, preferably comprising a pair of spaced apart support beams extending between and secured to the upstanding flanges of the base at its opposite ends and on which beam structure is supported the weighing spring, the indicator mechanism, and the thrust transferring bell crank lever, being all of the weighing mechanism except the weight receiving lever system.

Another important object is to provide a new and improved bell crank structure, in a weighing mechanism, for transferring the thrust of the main weighing levers to the weighing spring and the indicator; a further object being to provide a bell crank lever having knife edge pivots supported in floating or self-alining pivot bearings having means for limiting endwise movement of the knife edge pivots in the bearings; a further object being to form the bell crank lever from a single piece of sheet metal in which the knife edge pivots and the bearings through which the bell crank lever is connected with the main weighing levers and with the weighing spring, are formed in the piece by coining the same on one side only while flat, and thereafter bending the coined piece to desired bell crank lever shape; yet another object of the invention, as an alternate arrangement, is to provide a bell crank lever by assembling three sheet metal parts containing coined knife edge pivots in one part, a knife edge bearing for connection with the main weighing levers in another, the third part containing a bearing for engagement with a weighing spring connected draw rod.

Another important object is to provide four separate levers comprising heavy sheet metal stock and formed each with a pivot pin providing knife edges extending on the opposite sides thereof for rockably supporting an end of each lever in bearings disposed at the four corners of the scale base, said separate levers including a pair of relatively long levers rockably mounted in bearings formed in the opposite corners of the base at one end thereof, said levers extending thence for connection with a bell crank lever pivotally mounted at the opposite end of the base medially between the sides thereof, and a pair of relatively short levers rockably mounted in bearings formed in the corners of the base on opposite sides of the bell crank lever, the bearing remote ends of said relatively short levers being suspended in stirrups connected medially on the relatively long levers; a further object being to provide a suspension member for connecting the pivot remote ends of the relatively long levers upon the bell crank lever, said suspension member having a hook portion forming a bearing for rockably engaging a knife edge bearing of the bell crank lever and a pair of lobes forming knife edges on the suspension member for rockably receiving the pivot remote ends of the relatively long levers; a still further important object being to form the lever bearings in the base by upwardly pressing the sheet metal material of the base to form bearing pedestal domes having diametral slits extending therein across the top and in one side thereof to receive the pivot carrying ends of the levers for free movement within the slits, the tops of said domes being downwardly creased to form knife edge bearings on opposite sides of the slit in each dome, the pivot carrying ends of the levers being formed each with a downwardly opening slot adjacent the lever pivot pin to loosely embrace the side of the dome extending at the terminal end of the slit, to thereby retain the pivot pin of the lever in rocking engagement with the knife edge bearings; yet another object being to provide preferably polyethylene plastic disks forming feet for the scale base, said disks being sized to cover the downwardly opening ends of the bearing pedestal domes and having resilient latching fingers formed at the edges of said disks in position to extend latchingly in perforations formed in the scale base outwardly of said domes; still another object being to provide relatively twisted sheet metal loops embodying knife edge bearings at the opposite ends of the loops for rockably engaging seats, comprising notches formed in the pivot remote ends of the relatively short levers and medially between the ends of the relatively long levers, to thereby suspendingly interconnect each relatively short lever with a correspondingly relatively long lever.

Another important object is to provide the platform of the weighing scale with downwardly extending leg brackets, comprising sheet metal elements each having a medial portion secured to the underside of the platform, and a pair of spaced dependent legs forming downwardly facing knife edge bearing notches for rockable engagement with spaced lateral upwardly facing knife edges formed in a preferably sheet metal stirrup having a downwardly facing knife edge in position to rockably engage a notch forming an upwardly facing knife edge bearing in a weighing lever adjacent the pivotally supported end thereof; a further object being to form the spaced legs of each bracket with an opening adjacent and in alinement with the knife edge bearing notches, and to form the stirrups each with outwardly extending lugs opposite the lateral knife edges of the stirrup in position to extend and move freely in said openings, whereby to loosely shackle each stirrup in its corresponding bracket so that, when the platform is disassociated from the levers, the stirrups will be retained each on its bracket in position to engage the stirrup bearing notch of its corresponding lever as and when the platform is mounted in weight applying position on the levers.

Another important object resides in providing for the accurate alinement of the platform leg brackets as attached on the platform by forming the medial portion of each bracket with an opening for snugly receiving a dowel protrusion on the platform and with crimping slots disposed preferably on opposite sides of the dowel receiving opening, the brackets being secured on the platform by means of lugs integral with and struck from the body of the platform element, said lugs being crimped through said openings and upon the underside of the medial lug portion.

Another important object of the invention is to provide a low platform personal weight scale with a lifting handle attached upon the platform medially between the opposite sides of the platform, said handle extending at one end adjacent the dial remote or heel end of the platform and having a prop portion disposed in substantially vertical alinement with respect to the heel end of the platform and base, so that the scale may be supported in upright position upon the prop portion of the handle and the heel end of the platform or base.

The foregoing and numerous other important objects, advantages, and inherent functions of the invention will become apparent as the same is more fully understood from the following description, which, taken in connection with the accompanying drawings, discloses preferred embodiments of the invention.

Referring to the drawings.

To illustrate the invention the drawings show a weighing scale 13 comprising a support base 14, weighing mechanism 15 supported on the base, a weight receiving platform 16 carried by the weighing mechanism and adapted to move the same in proportion to a weight disposed on the platform for measurement, graduated indicating means 17 comprising a dial 18 exposed to view through a window W formed in the platform, and indicator driving means 19 actuated by the weighing mechanism to shift the dial 18 with respect to an index element 20 disposed in the window.

The base 14 and platform 16 comprise generally rectangular drawn sheet metal plates having preferably rounded corners and marginal flange portions forming shallow pan-like elements adapted to provide a box-like housing for enclosing the weighing mechanism and the indicating means, when the platform is mounted upon the weighing mechanism in position enclosing the open top of the base.

The base 14 preferably comprises a sheet metal plate 21 forming a flat, generally rectangular floor and an upstanding marginal flange 22 defining the peripheral edge of the plate. Inwardly of said edge the plate is formed with integral upwardly pressed bearing pedestal domes 23, which may be located in the corners of the rectangular plate. These domes 23 are former each with a diametral slit 24 extending across the top of the dome and in one side thereof, the top of the dome being formed with a crease 25 extending across the top of the dome on opposite sides of and at right angles with respect to the slit 24, said crease forming upwardly facing knife edge bearings on opposite sides of the slit. The ends of the domes 23 which open upon the underside of the plate 21 may be closed by preferably polyethylene plastic disks 26 forming supporting feet for the base, said disks being formed with peripheral projections 27 providing resilient latching lugs adapted to extend through latch receiving openings 27' formed in the plate 21 on opposite sides of the dome 23, to thereby secure the feet forming covers 26 in position on the base beneath the domes 23.

The weighing mechanism comprises a plurality of weight receiving levers fulcrumed in the knife edge bearings formed by the creases 25 in the pedestal domes 23, a weighing spring S supported on the base 14, means for suspending the weight receiving levers on the weighing spring, and means for actuating the weight indicater in response to extension of the spring S under the influence of a weight applied on the levers for measurement. As shown, the levers may comprise a pair of relatively long levers 28, and a pair of relatively short levers 29 each cooperatively associated with a corresponding one of the relatively long levers. The levers may each be formed with pivot means 30 at one end and a yoke engaging notch 31 at the opposite end of the lever. The relatively long levers may be supported on the pedestal domes at one end of the base plate and extend thence toward the opposite end of the base medially between the corners thereof. The relatively short levers 29 may be supported on the remaining pedestal domes at said opposite end of the base, said relatively short levers extending from their supporting pedestal domes each toward the medial portion of a corresponding relatively long lever. The pedestal dome remote ends of the short levers are suspended each on its associated relatively long lever, as by means of a loop 32 forming a suspension yoke, said loop preferably comprising a sheet metal stamping forming inwardly facing knife edges at the opposite ends thereof. The opposite ends of said loop may be relatively twisted so that the knife edges thereof may rockingly engage the downwardly opening notch 31 in the pedestal dome remote end of the relatively short lever and an upwardly facing notch 33 formed on and medially between the opposite ends of the relatively long lever.

Figures 7, 8, 9, 10, 11, 12, 13, 14:
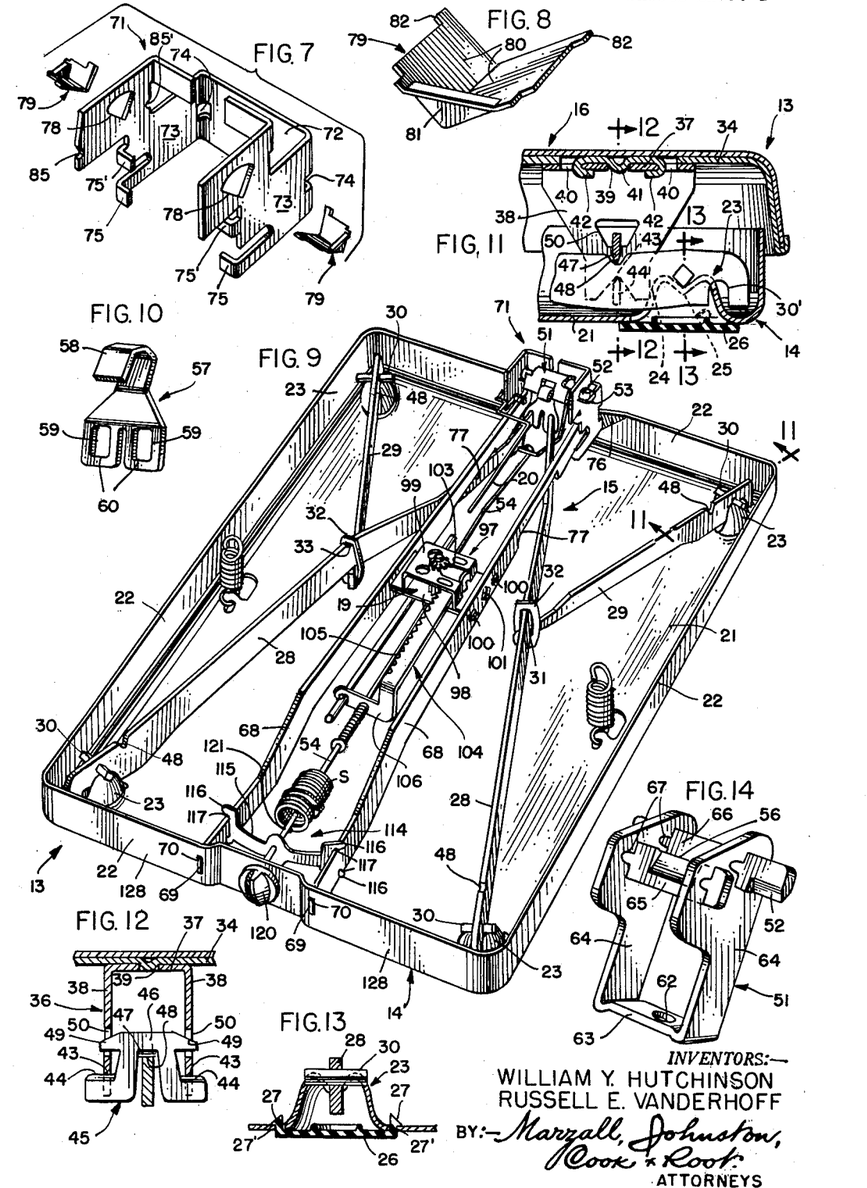
FIG. 7 is an exploded view of parts shown in perspective and forming a bearing bracket for the bell crank lever shown in FIGS. 5 and 6.
FIG. 8 is a perspective view of a floating knife edge bearing element forming a component of the bracket assembly shown in FIG. 7.
FIG. 9 is a perspective view of a portion of the weighing scale.
FIG. 10 is a perspective view of a double lobed suspension member for connecting the weight receiving levers with the bell crank lever.
FIG. 14 is a perspective view of a modified bell crank lever that may be substituted in the scale assembly for the lever shown in FIG. 5.
Figure 15:
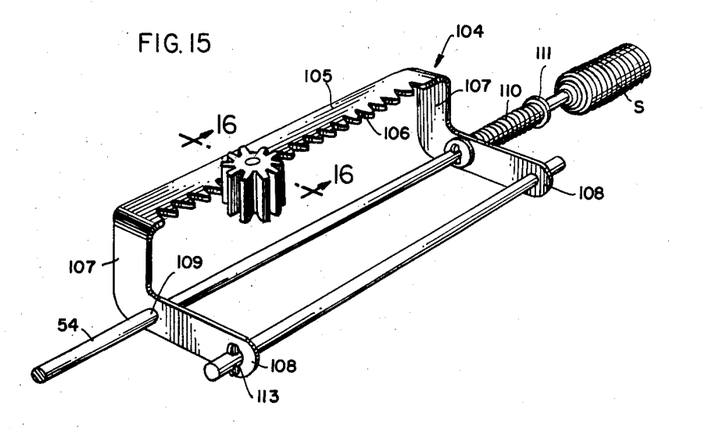
FIG. 15 is a perspective view of an indicator driving rack structure.
Figure 16:
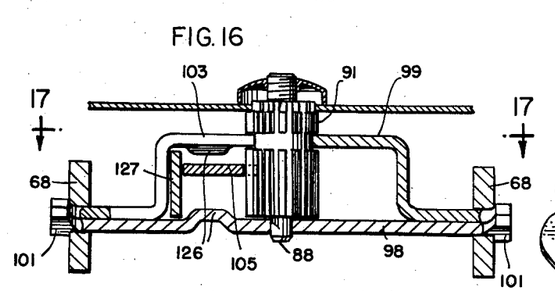
Figure 17:
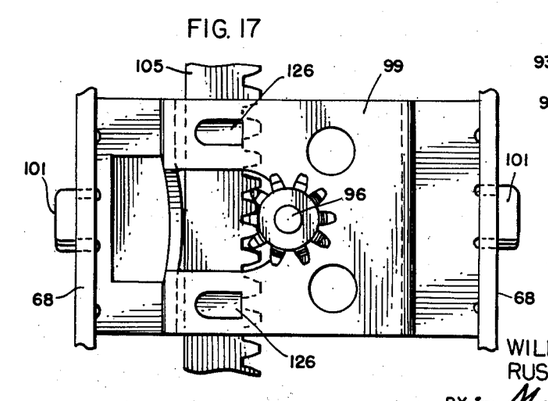
Figure 18:
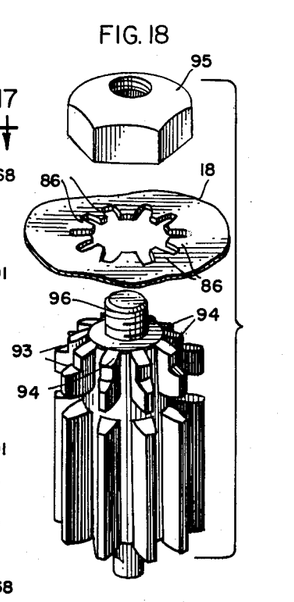
FIG. 18 is an exploded view of an indicator disk and a disk carrying pinion.

The long and short levers 28 and 29 may comprise steel bars which may be formed by stamping the same from sheet material; and the pivot means 30 may comprise steel pins of rectangular sectional configuration press fitted through openings formed in the levers to provide downwardly facing knife edges, on opposite sides of the lever, in position to engage the upwardly facing bearings provided by the creases 25 in the pedestal domes 23. The levers, adjacent the pivot means 30, may each be formed with a downwardly opening notch 30' in position to straddle the side of the lever supporting dome 23 at the end of the slot 24 remote from its extension in one side of the dome, as shown in FIG. 11.

The weighing scale also includes the platform element 16, the same preferably comprising a drawn sheet metal shell having a central, generally rectangular weight carrying portion 34, and an integral dependent marginal skirt portion 35 sized to loosely embrace the upper portions of the marginal flange 22 of the base 14. Means is provided for supporting the platform element on the weighing levers 28 and 29 in position overlying the same, with the marginal skirt portion 35 extending to and outwardly of the outstanding marginal flange portion 22 of the base, whereby the weighing levers 28 and 29, the indicating means 17 and associated mechanism are enclosed between and within the casing structure afforded by the base and platform elements.

To this end, the platform element carries dependent supporting leg brackets 36, each preferably comprising a sheet metal element of U-shaped configuration attached upon the underside of the platform element. Each leg bracket 36 includes a medial flat portion 37 adapted to engage and be secured to the underside of the platform portion 34, and a pair of spaced apart dependent leg portions 38. In order to secure the brackets 36 in accurately determined position on the platform element, the medial bracket portions 37 are each provided with a preferably central opening 39 and a pair of slots 40 on opposite sides of the opening 39, said opening being sized to snugly receive a dowel protrusion 41 formed in the platform element, there being a bracket alining protrusion formed in each of the four corners of the platform element in order to accurately aline each of the leg brackets 36, the brackets being secured to the platform element by means of integral curled fingers 42 struck from the body of the platform portion 34 in position to extend through the slots 40 and crimpingly engage the end edges of the slots adjacent and on opposite sides of the dowel opening 39.

The spaced apart leg portions 38 have lower ends formed with downwardly facing bearing notches 43 adapted to engage and rockingly rest upon the oppositely extending and upwardly facing knife edges 44 of a cooperating stirrup 45. Each stirrup may embody a central portion 46 formed with a downwardly facing knife edge 47 in position to rockingly engage an upwardly facing notch 48 formed in the weighing lever adjacent the pivot means 30. If desired, the medial portion 46 of each stirrup may be provided with outwardly extending ears 49 extending through and freely movable within openings 50 formed in the bracket legs 38, so that the stirrups are secured loosely or shackled on the leg brackets 36 at all times in position to rockingly engage their knife edges 47 with the notches 48 in the levers whenever the platform is applied in operative position covering the open top of the base.

From the foregoing it will be apparent that the platform is supported upon the levers 28 and 29 entirely by means of the stirrups 45. Accordingly, any weight disposed upon the platform for measurement will be applied upon the levers and hence to the weighing spring S upon which the levers are suspended. In order to provide for suspending the levers upon the weighing spring S, the pedestal dome remote ends of the long levers 28 are connected with the short arm of a bell crank 51 having oppositely extending knife edge pivots 52 rockably supported in bearings 53 carried on the base 14, the long arm of the bell crank lever being pivotally connected with a draw rod 54 which is connected, as at 55, with the free end of the weighing spring S, the other end of the spring being suitably anchored upon the base 14.

It will be seen from the foregoing that the longitudinal movement imparted to the draw rod 54, in response to the application of a weight to be measured upon the platform, will be proportional to the extension of the weighing spring S and will consequently indicate the amount of the weight to be measured; and the indicator driving means 19 functions to actuate the indicator 17 in response to longitudinal movement of the draw rod 54.

Figures 1, 2, 3, 4, 5, 6:
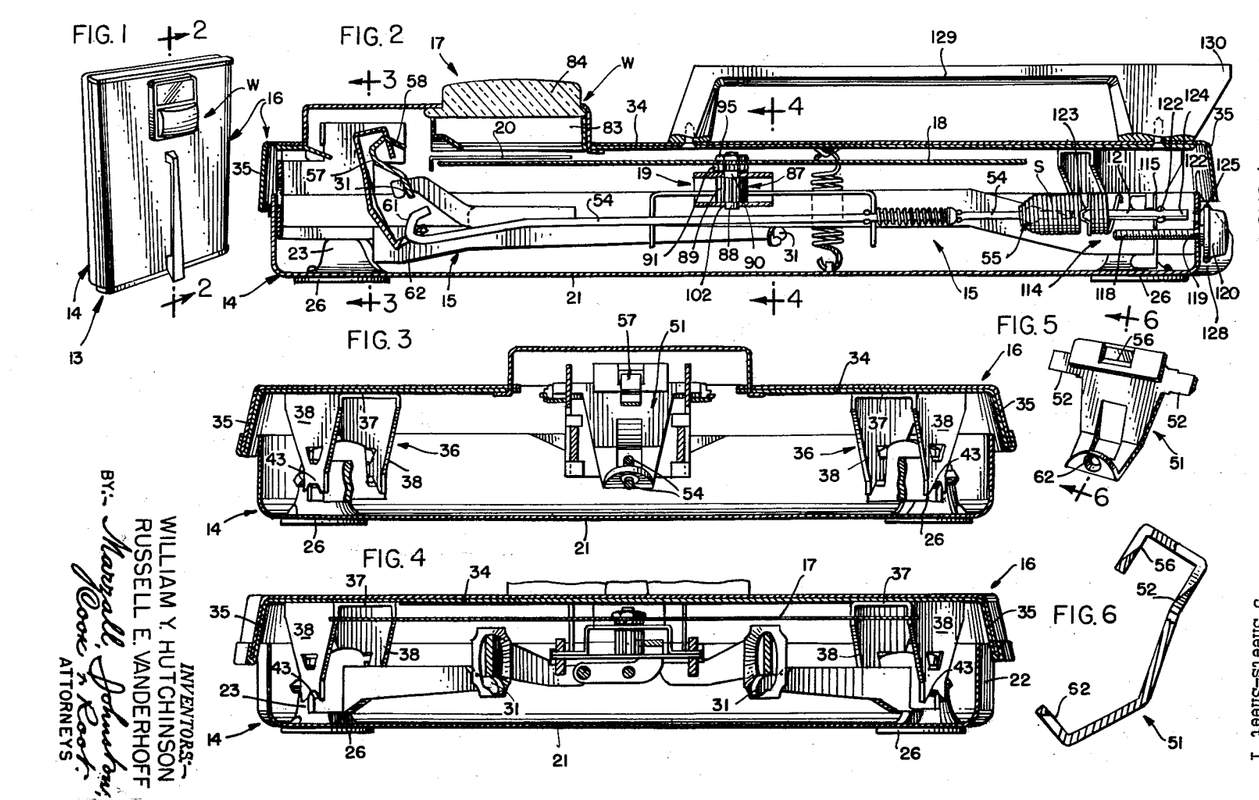
FIG. 1 is a perspective view of a weighing scale embodying the present invention.
FIGS. 2, 3, 4, 6, 11, 12, 13, 16 and 17, respectively, are sectional views taken substantially along the line 2—2 in FIG. 1, the lines 3—3 and 4—4 in FIG. 2, the line 6—6 in FIG. 5, the line 11—11 in FIG. 9, the lines 12—12 and 13—13 in FIG. 11, the line 16—16 in FIG. 15, and the line 17—17 in FIG. 16.
FIG. 5 is a perspective view of a bell crank lever forming a component of the weighing scale.

As shown more particularly in FIGS. 5, 6 and 14 of the drawings, the short arm of the bell crank 51 may be defined as the vertical distance between a yoke engaging knife edge 56 and the alined knife edges 52; and the pedestal dome remote ends of the long levers may be connected with the knife edge 56 by means of a preferably double lobed yoke 57 of the sort illustrated in FIG. 10 of the drawings, said yoke preferably comprising a sheet metal element formed at one end with a hook 58 adapted to be suspended rockingly upon the knife edge 56 of the bell crank. The hook remote end of the yoke may comprise a pair of lobes formed with openings 59 defining knife edges 60 in position to be received rockingly in the notches 31 at the pedestal dome remote ends of the long levers 28. The spring remote end of the draw rod 54 may be provided with a hook 61 adapted to rockingly engage a knife edge 62 defining the long arm of the bell crank.

It will be seen that, since the short levers 29 are each suspended upon a cooperating long lever 28, and since the long levers are both suspended on the weighing spring S through the yoke 57, the bell crank 51 and the draw rod 54, the entire lever system is connected with the weighing spring and will extend the same in proportion to the amount of weight applied upon the platform.

As shown more particularly in FIGS. 5 and 6, the bell crank 51 may be conveniently be formed as a unitary integral pressed sheet metal element in which the knife edges 52, 56 and 62 may all be formed by coining, that is to say, beveling the edges from one side of the element while in flat condition and then bending or pressing the same to desired bell crank form. Alternately, the bell crank, as shown in FIG. 14, may comprise a generally U-shaped component having a medial portion 63 containing the knife edge opening 62 centrally therein, and a pair of spaced arms 64 between which may be secured a pair of bars 65 and 66, respectively containing the knife edge 56 and the knife edges 52, the bar 66 extending through and outwardly of the arms 64 and the knife edges 62 being formed therein outwardly of the arms 64. The bars 65 and 66 may extend in openings formed in the arms 64 and the material of said arms may be crimpingly squeezed upon the bars, the arms being provided with notches 67 to facilitate the crimping operation.

In order to render the scale mechanism of the present invention exceedingly accurate, means is provided for applying the thrust reactions of the bell crank 51, of the indicator driving mechanism 19, and of the weighing spring entirely upon the strongest and most rigid portions of the base 14, that is to say, upon the upstanding peripheral flange 22, the thrust of the levers upon the base through the pedestal domes 23 being applied through the feet elements 26 directly upon the floor or other support structure upon which the scale may be disposed when in use. Accordingly, it will be seen that none of the thrust of the weight measuring and indicating components of the scale is applied upon the relatively flimsy floor portion 21 of the base, thereby avoiding weight measuring and indicating errors through deflection of the base.

To this end, the bell crank lever 51, the weight indicating mechanism, and the weighing spring are all supported upon a frame structure embodying a pair of spaced apart longitudinally extending beams 68, which are secured at their opposite ends upon the upstanding flange portions 22 medially of the opposite ends of the base 14, whereby the beams 68, in conjunction with the upstanding flanges of the base, form an exceedingly rigid framework upon which the bell crank, the indicator and its driving mechanism, and the weighing spring are all supported.

As shown, the beams 68 are formed with projections 69 at one end thereof sized for press fitting engagement in slots 70 formed in the flange 22 at the heel end of the base. At the opposite or toe end of the base the beams 68 carry a bell crank journaling bracket 71, which is shown in detail in FIG. 7 of the drawings. This bracket may be formed from a single unitary piece of sheet metal, including a medial portion 72 adapted to lie against the inner face of the peripheral flange 22 and a pair of side or wing portions 73 extending normally of the medial portion 72 and hence projecting inwardly at right angles with respect to the flange 22.

The bracket 71 may be formed with a slot 74 at the junction of each wing portion 73 with the medial portion 72. Each wing portion 73, also, at the end thereof remote from the medial portion 72, may be formed with a pair of vertically spaced inturned fingers 75 and 75' for engaging the upper and lower edges of the beams 68, the ends of the beams having projecting portions of reduced width which extend snugly through the openings 74 and through slits formed in the upstanding flange 22, said slits, at each side of the bracket 71, being defined by inwardly pressed or bent portions 76 of the flange 22 disposed on opposite sides of the bracket 71 to hold the same in centered position on the base. Inwardly of the bracket 71 the undersides of the beams 68 may be notched, as indicated at 77, to accommodate the movement of the levers 28 beneath said beams.

The bracket wings 73, above the inturned fingers 75 and 75' may be formed with fan-shaped openings 78 sized to snugly yet rockably receive floating knife edge bearing elements 79, which may be formed as sheet metal stampings or pressings. Said bearing elements, as shown more particularly in FIG. 8 of the drawings, may comprise a pair of mutually inclined plate portions 80 forming a V-shaped bearing, an end thrust wall 81 being formed between the plate portions 80 at one end of the bearing element. A pair of outstanding retaining fingers 82 may be formed at the outer edges of the plate portions 80 at the ends thereof remote from the wall 81, said fingers being adapted to engage the inwardly facing surfaces of the bracket wings 73 in order to retain said bearing elements in the bracket.

It will be seen that the bearing elements 79 are supported in the bracket in position to receive and supportingly engage the oppositely extending knife edges 52 of the bell crank 51; and it is intended that the bell crank shall be assembled in the bracket prior to the bending of the same in order to aline the wings 73 in parallel relation and prior to the assembly of the bracket upon the beams 68 and in the base structure, so that the bell crank will be permanently assembled in the structure in position supported in the bracket mounted bearing elements 79 which, because of the relatively loose fit thereof in the openings 78, comprise floating and self-alining bell crank bearings.

The present invention contemplates novel indicator actuating means 19 for driving the indicator 17 in response to longitudinal movement of the rod 54. As shown, the indicator comprises a circular dial 18 having weight graduations formed on its peripheral edge and turnably mounted upon the base beneath the platform 16 which, at one end, is provided with an opening 83 forming the window W, said opening being preferably covered by a transparent pane element 84, which if desired may comprise a magnifying lens. The peripheral edge of the dial 18 may turn beneath the opening 83 past the stationary index element 20, which may conveniently comprise a length of wire latchingly secured upon the bracket 71, as in wire supporting notches 85 and 85′ formed in the bracket.

The dial 18 may be formed with a medial opening embodying inwardly extending teeth 86 adapted to meshingly engage the latching teeth of a dial driving pinion 87 forming a part of the indicator driving mechanism 19. The pinion 87 preferably has a stub axle 88 at one end, a rack engaging portion 89 extending between the stub axle 88 and a medial axle 90, and a dial engaging pinion portion 91 extending at the end of the medial axle 90 remote from the rack engaging pinion portion 89. The ends of the teeth of the dial engaging pinion portion 91 may be cut back or relieved, as at 92, to provide ledges 93 and stub teeth 94 upon which ledges the dial may be supported outwardly of its central opening with the teeth 86 in meshing engagement with the stub teeth 94; and the dial may be held in position by means of a fastening nut 95 attached upon a threaded stub 96 projecting at the end of the pinion remote from its stub axle 88.

The dial driving and carrying pinion 87 may be turnably supported in a bracket 97 extending between and secured to the beams 68, said bracket preferably comprising a pair of sheet metal plates 98 and 99 having opposite ends secured together and spaced apart medial portions, the interconnected ends of the plates having projections 100 extending in openings formed in the beams 68, and a twisted latching projection 101 for anchoring the opposite ends in the beams. The lower bracket plate 98 may be formed medially with an opening 102 providing a journal turnably receiving the stub axle 88 of the pinion. The upper bracket plate 99 is formed with an enlarged opening 103 terminating medially of the plate in a half bearing adapted to turnably receive the medial bearing portion 90 of the pinion. As a consequence, the pinion may be assembled in the bracket before the plate 99 is secured to the plate 98 by applying the rack engaging portion 89 of the pinion axially through the opening 103, thereby permitting the medial bearing portion 90 to be engaged with the half bearing formed at the end of the opening 103, with the rack engaging and dial carrying pinion portions 89 and 91 extending on opposite sides of the bracket plate 99. Thereupon the plate 98 may be assembled with the plate 99 in position receiving the stub axle 88 of the pinion in the opening 102 of the plate 98, after which the alined portions 100 and 101 of the plates 98 and 99 may be mounted in the openings formed to receive them in the beams 68; and the bracket 97 comprising the plates 98 and 99 may then be bracingly interconnected between the beams 68, thereby strengthening and rigidifying the same merely by twisting the outwardly projecting locking ends 101 of the plates 98 and 99. By so twisting the locking ends, the plates 98 and 99 are secured rigidly in assembled position by action of their projections 100 in the receiving openings in the beams; and the bracket plates 98 and 99 so fastened to the beams constitute a beam strengthening bracket secured between the medial portions of the beams.

At the time the plates 98 and 99 are assembled with the pinion, as aforesaid, but before the same are crimped in mounted position upon and between the beams 68, a pinion driving rack element carried by the draw rod 54 may also be assembled between the bracket plates in position drivingly engaging the pinion portion 89. This rack element, as shown, may conveniently comprise a formed sheet metal strip 104 having a medial portion 105 providing rack teeth 106 extending in a longitudinal edge of said medial portion, said strip having ends 107 extending in planes normal to the medial portion 105, said ends having terminal fingers 108 projecting therefrom and outwardly of the rack forming edge of the medial portion 105. The ends 107 of the rack element are formed with openings providing bearings for rockably and slidably receiving the draw rod 54 therethrough so that the rack carrying medial portion 105 may rock on the rod 54 with respect to the dial driving pinion; and the rod 54 may be formed, as by swaging the same at 109, to limit longitudinal movement of the rack element 104 on the rod 54 in one direction. Means preferably comprising a resilient buffering spring 110 may be mounted on the rod 54 between a spring anchor 111 and one of the rack ends 107 in order to hold the rack element at all times yieldingly in engagement with the stop 109.

In order at all times to yieldingly urge the rack teeth 106 upon the teeth of the dial driving pinion, a counterpoise weight may be applied to the ends of the fingers 108 on the side of the draw rod 54 remote from the rack carrying portions of the element 104. This counterpoise weight may conveniently comprise a selected length of wire stock 112 extending in openings formed in the fingers 108 and secured in place, as by peening or crimping the material of the wire stock, as at 113, at the outwardly facing sides of the fingers 108. By assembling a wire 112 of excessive length, the dial driving mechanism can be accurately adjusted to obtain a desired rack thrust against the pinion by progressively cutting off the opposite ends of the wire outwardly of the fingers 108 until a desired counterpoise weight is obtained. Such adjustment, of course, may be made after the components of the scales are all assembled as a final step in conditioning the scale for operation.

The present invention also contemplates a novel adjustable anchorage 114 for the weighing spring S. As shown, said anchorage may comprise a flexible strip of spring material 115 having a pair of spaced apart beam embracing fingers 116 at each of its opposite ends, said fingers being adapted to seat in notches 117 formed in the upper and lower edges of the beams 68. Medially of its ends, the member 115 may be formed for threaded engagement with an adjusting screw 118 extending outwardly through an opening formed in the base flange 22 medially of the heel end of the base, said screw having an embossment 119 bearing upon the outer face of the flange 22 around the opening through which the screw extends. Outwardly of the embossment, the screw 118 may be formed with a knob 120 to permit manual operation of the screw. By turning the knob, it will be seen that the bowed condition of the member 115 may be adjusted at will; and means is provided for anchoring the spring S medially upon the member 115.

As shown, the spring anchoring means may conveniently comprise a stem 121 extending turnably through an opening in the central portions of the spring member 115 and swaged, as at 122, to support the stem on the member 115. One end of the stem 121 may be formed with a spring connecting head 123 adapted for threaded interfitment with the coils of the weighing spring S, so that the stem 121 may be adjusted longitudinally of the spring by relatively turning the head with respect to the spring in order to advance or retract said head axially of the spring in calibrating the same. The opposite end of the stem 121 may be formed with a diametral slot 124 and disposed at and in line with an opening 125 in the upstanding flange 22 of the base, said opening being disposed in position behind the knob 120.

Accordingly, when necessary to adjust the spring upon the anchoring stem 121, the knob 120 may be removed from the threaded stem 118 to uncover the opening 125 so that the slotted end of the calibrating stem 121 may be drivingly engaged with an adjusting tool, such as a screwdriver, in order to turn the stem and the threaded spring connected head 123 thereof with respect to the spring to calibrate the same. After the desired calibration has been accomplished, the zero setting knob 120 may be replaced upon the outer end of the adjusting stem 118.

It will be seen from the foregoing that the spring S and its anchorage 114 may be assembled upon the rod 54 together with the pinion driving rack element 104, which may then be assembled between the bracket plates 98 and 99 along with the dial driving pinion prior to the assembly of said plates upon and between the beams 68. Thereafter the beams 68 may be assembled with the bell crank lever supporting bracket 71 and mounted upon the upstanding flanges 22 of the base element 21.

In order to guide the movement of the rack carrying portion 105 between the bracket plates 98 and 99, the plates may be formed with inwardly pressed embossments 126 in position facing the opposite sides of the rack portion 105 and an embossment 127 in position behind the rack remote longitudinal edge of the medial portion 105 of the rack element.

As shown more particularly in FIGS. 1 and 2, the present invention contemplates simple and inexpensive means for permitting the scale structure to be stood upon its heel end. In order to permit such facility, the lower portions of the upstanding flange 22 of the base may be bulged outwardly, as shown at 128, on opposite sides of the zeroizing knob 120 in order to provide support feet. The platform may be provided with a medially extending handle 129 having opposite ends respectively disposed at the heel end and medially of the platform adjacent the window W; and the window remote end of the handle may be extended to form a toe 130 projecting slightly outwardly of the heel end of the platform, such toe, together with the bulged portions 128 of the scale base, providing a firm support for the scale structure when stood on end in the manner shown in FIG. 1.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A weighing scale comprising a support frame having front and rear ends, a weight receiving lever extending between the said front and rear ends of the frame and having a fulcrumed end pivoted on the frame at the said rear end thereof, a resilient weighing spring anchored on the frame at said rear end thereof, a bell crank rockably supported on the frame, at the said front end thereof, and having short and long arms connected respectively with said lever, remote from the fulcrumed end thereof, and with said spring, and an indicator driven in response to movement of the lever under the influence of a weight applied thereto.

2. A weighing scale comprising a support frame having front and rear ends, a weight receiving lever extending between the said front and rear ends of the frame and having a fulcrumed end pivoted on the frame at the said rear end thereof, a resilient weighing spring anchored on the frame at said rear end thereof, a bell crank rockably supported on the frame, at the said front end thereof, and having one arm connected with said lever, remote from the fulcrumed end thereof, a draw rod connecting the other arm of the bell crank with said spring, and an indicator driven in response to movement of the draw rod under the influence of a weight applied on the lever.

3. A weighing scale comprising a support frame, a weight receiving lever fulcrumed on the frame, a resilient weighing spring, means including an axially shiftable draw rod connecting the lever with said spring, an indicator having a driving pinion, and an indicator actuating element pivoted on the draw rod for rocking movement about the axis thereof, said element providing a rack in position engaging said pinion and having a weighted portion urging the element on the rod in a direction to press the rack against the pinion.

4. A weighing scale comprising a support frame, a weight receiving lever fulcrumed on the frame, a resilient weighing spring, means including an axially shiftable draw rod connecting the lever with said spring, an indicator having a driving pinion, an indicator actuating element embodying a sheet metal strip having a medial portion forming a rack and bent ends rockably mounted on the draw rod for movement about its axis, and a length of wire forming a counterpoise secured to said element in position urging it on the rod in a direction to press the rack against the pinion.

5. A weighing scale comprising a support frame, a weight receiving lever fulcrumed on the frame, a resilient weighing spring, means connecting the lever with the spring, an indicator having a driving pinion, said pinion being turnably journaled in a half bearing, a rack driven in response to the movement of the lever under the influence of a weight applied thereto, and means pressing said rack upon the side of the pinion opposite said half bearing to hold the pinion in said bearing.

6. A weighing scale comprising a support frame providing a pair of spaced support members formed with bracket anchorage sockets, a weight receiving lever fulcrumed on the frame, a resilient weighing spring, means connecting the lever with the spring, an indicator having a driving pinion, a rack in engagement with said pinion and driven in response to movement of the lever under the influence of a weight applied thereto, and a pair of plates forming a mounting bracket for said pinion, said plates having spaced medial portions forming pinion bearings and overlying end portions including bracket mounting portions sized for snug assembled reception in said bracket anchorage sockets of said spaced support members to secure the plates together in assembled relationship, with the rack and pinion in position disposed between the spaced medial portions of the plates.

7. A weighing scale comprising a sheet metal plate forming a support frame having upstanding marginal flanges at the opposite ends of the frame, beam means extending between, secured to and supported solely by said marginal flanges, a weight receiving lever fulcrumed on the frame, and lever connected weighing elements including a resilient weighing spring, an indicator and indicator actuating means for driving the indicator in response to the application of a weight to be measured on the lever, said weighing elements all being mounted on said beam means and thus supported upon said marginal flanges of the frame.

8. A weighing scale comprising a support frame having upstanding marginal flanges at the opposite ends of the frame, a weight receiving lever fulcrumed on the frame, a pair of spaced apart beams secured to and extending between said flanges, and lever connected weighing elements supported on said beams including a resilient weighing spring connected at one end on said beams, a bell crank pivoted in a bracket on said beams, a draw rod connecting an arm of the bell crank with the spring, means connecting the other arm of the bell crank with the weight receiving lever, an indicator carrying bracket extending between and bracingly interconnecting the beams, an indicator supported on the bracket, and means to drivingly connect the indicator with the draw rod.

9. A weighing scale comprising a support frame providing a pair of spaced support members forming mounting abutments, a weight receiving lever fulcrumed on the frame, a resilient weighing spring, means to connect the lever with the spring, an indicator, means to drive the indicator in response to extension of the spring, and means to adjustably mount the spring upon said mounting abutments comprising a flexible blade forming a mounting element extending curvingly between and having opposite ends supported on said abutments, and means to adjust the bowed condition of the mounting element to determine the location of the anchored end of the spring in the assembly in order to zeroize the indicator.

10. A weighing scale comprising a support frame providing a spring mounting, a weight receiving lever fulcrumed on the frame, a resilient weighing spring, means to connect the lever with the spring, an indicator, means to drive the indicator in response to extension of the spring, and means to adjustably attach the spring upon the mounting comprising a stem turnably supported in the mounting and having a tool engaging end extending on one side of the mounting and formed for detachable connection with a stem turning tool, said stem having a spring engaging head disposed upon the opposite side of the mounting in position for turnable engagement with the coils of said spring to thereby alter the effective length of the spring by turning the stem on the mounting.

11. A weighing scale as set forth in claim 10, wherein said support frame embodies an upstanding housing wall extending normal to said stem and outwardly of its tool engaging end, said housing wall having a tool access opening formed therein in coaxial alinement with said stem.

12. A weighing scale comprising a sheet metal plate forming a support frame, a weight receiving lover fulcrumed on the frame, a resilient weighing spring, means to connect the lever with the spring, an indicator, and means to drive the same in response to extension of the spring under the influence of a weight applied on the lever, said plate having an upwardly pressed pedestal dome formed therein, said dome having a slot extending across its top, said slot, at one end, forming an extension disposed in a side of the dome, the top of the dome being creased transversely of the slot to form upwardly facing bearings extending transversely and on opposite sides of said slot in position to receive knife edges formed on and extending at the opposite sides of the lever when the same is assembled in said slot.

13. A weighing scale as set forth in claim 12, wherein the lever adjacent said knife edges is formed with a downwardly opening notch in position to straddle the side of the dome at the end of the slot remote from the extension.

14. A weighing scale comprising a support frame, a weight receiving lever fulcrumed on the frame, a resilient weighing spring connected with the lever, and an indicator movable in response to the extension of the spring under the influence of a weight applied to the lever, including a bell crank drivingly connected with said lever and with said indicator, said bell crank comprising a bent piece of sheet metal stock formed with an opening therethrough having a beveled edge providing a driving knife edge in an arm of the bell crank, means on said bent piece forming a pair of oppositely outstanding arms providing alined fulcrum knife edges on the opposite sides of said bell crank and facing toward said opening, and means on said bent piece forming a driven knife edge on another arm of the bell crank in position parallel to and spaced from said alined fulcrum knife edges, said driven knife edge facing away from said opening.

15. A weighing scale as set forth in claim 14, wherein the bent piece of sheet metal stock is of generally U-shaped configuration providing spaced arms with the opening forming the driving knife edge disposed medially between said arms, the alined fulcrum knife edges being formed on a bar secured on and between and projecting outwardly of said arms remote from said driving knife edge, and said driven knife edge being formed on a bar extending between and secured to said arms, remote from said driving knife edge and spaced from said alined fulcrum knife edges.

16. A weighing scale as set forth in claim 14, wherein said bent piece of sheet metal stock is of generally C-shaped configuration with the driving and driven knife edges disposed at the opposite ends of said piece, the alined fulcrum knife edges being formed adjacent the end of the piece remote from the opening forming the driving knife edge and adjacent the driven knife edge.

17. A weighing scale comprising a support frame, a weight receiving lever fulcrumed on the frame, a resilient weighing spring connected with the lever, and an indicator movable in response to the extension of the spring under the influence of a weight applied to the lever, bell crank bearings formed on the frame, a driving link and a driving linkage connected respectively with said lever and said indicator, said link and linkage being each formed with a knife edge bearing, and a bell crank having alined oppositely extending knife edges supported on said bell crank bearings, and spaced kife edges drivingly connected respectively with the knife edge bearings of said link and said linkage, said bell crank comprising a single piece of sheet metal coined only on one side of the piece, while flat, to form said oppositely extending knife edges and said spaced knife edges, and then bent to the configuration of a bell crank.

18. A weighing scale comprising a support frame providing a pair of spaced support plates formed with alined openings, a weight receiving lever fulcrumed on the frame, a resilient weighing spring connected with the lever, and an indicator movable in response to the extension of the spring under the influence of a weight applied to the lever, including a bell crank drivingly connected with said lever and with said indicator, said bell crank having a pair of oppositely outstanding arms extending in said alined openings and forming knife edges, and knife edge bearing elements floatingly supported in said openings in position to rockingly receive said knife edges, said elements each comprising a sheet metal pressing having mutually inclined panel portions forming a knife edge bearing at the junction of the panels and an end thrust wall disposed normal to said panel portions, at one end of the element, in position to abut the end of a said arm of the bell crank.

19. A weighing scale as set forth in claim 18, wherein the end thrust walls of the knife edge bearing elements overlie the outer ends of the oppositely extending arms of the bell crank, whereby said arms serve to retain the elements in the alined openings of the support plates, said elements having retaining lugs to limit outward movement thereof through said openings.

20. A weighing scale comprising a support frame and a platform forming an inclosure, weighing mechanism, including a weighing lever, a spring and an indicator drivingly interconnected together and with the frame and platform and disposed within the inclosure, and a carrying handle mounted on the platform between the sides thereof, said handle having an end forming a supporting toe extending above the platform at the rear end thereof, whereby to support the scale on said end, said support frame having front and rear ends and an upstanding flange at the rear end thereof, beneath the platform, said flange being bulged beneath the platform and outwardly of its rear end, to form spaced feet on opposite sides of the rear end of the frame, whereby to provide stable support for the scale on said spaced feet and the supporting toe at the end of the handle.

References Cited by the Examiner

UNITED STATES PATENTS

| | | | |
|---|---|---|---|
| 970,030 | 9/10 | Fisher | 308—24 X |
| 1,116,268 | 11/14 | Hansen | 177—225 X |

(Other references on following page)

UNITED STATES PATENTS

| | | | |
|---|---|---|---|
| 1,223,787 | 4/17 | Hansen | 177—167 |
| 1,576,948 | 3/26 | Cameron | 177—234 X |
| 1,636,257 | 7/27 | Strubler et al. | 177—234 |
| 1,667,635 | 4/28 | Nauss | 308—2 |
| 1,818,323 | 8/31 | Hallead | 308—2 |
| 1,924,830 | 8/33 | Bennett | 308—24 X |
| 2,047,681 | 7/36 | Greenleaf | 177—234 X |
| 2,049,632 | 8/36 | Sutton | 177—230 X |
| 2,056,546 | 10/36 | Weber et al. | 177—234 X |
| 2,061,278 | 11/36 | Kircher | 177—234 X |
| 2,069,757 | 2/37 | Hansen | 177—225 X |
| 2,098,846 | 11/37 | Weber | 177—239 X |
| 2,232,830 | 2/41 | Sutton | 177—169 |
| 2,321,585 | 6/43 | Cummings | 177—231 |
| 2,766,038 | 10/56 | Weber | 177—234 X |
| 2,853,813 | 9/58 | Burreson | 38—77 |
| 2,875,999 | 3/59 | Provi et al. | 177—230 |
| 2,960,329 | 11/60 | Hanssen | 177—234 X |
| 2,969,175 | 1/61 | Bliss | 235—1.3 |
| 3,097,966 | 7/63 | Provi | 177—239 |
| 3,101,804 | 8/63 | Aleks | 177—239 |

FOREIGN PATENTS

| | | |
|---|---|---|
| 717,260 | 10/54 | Great Britain. |

LEO SMILOW, *Primary Examiner.*

ISAAC LISANN, *Examiner.*